Sept. 21, 1965   P. E. MERCIER   3,207,180
PRESSURE FLUID DISTRIBUTORS
Filed June 24, 1963   4 Sheets-Sheet 1
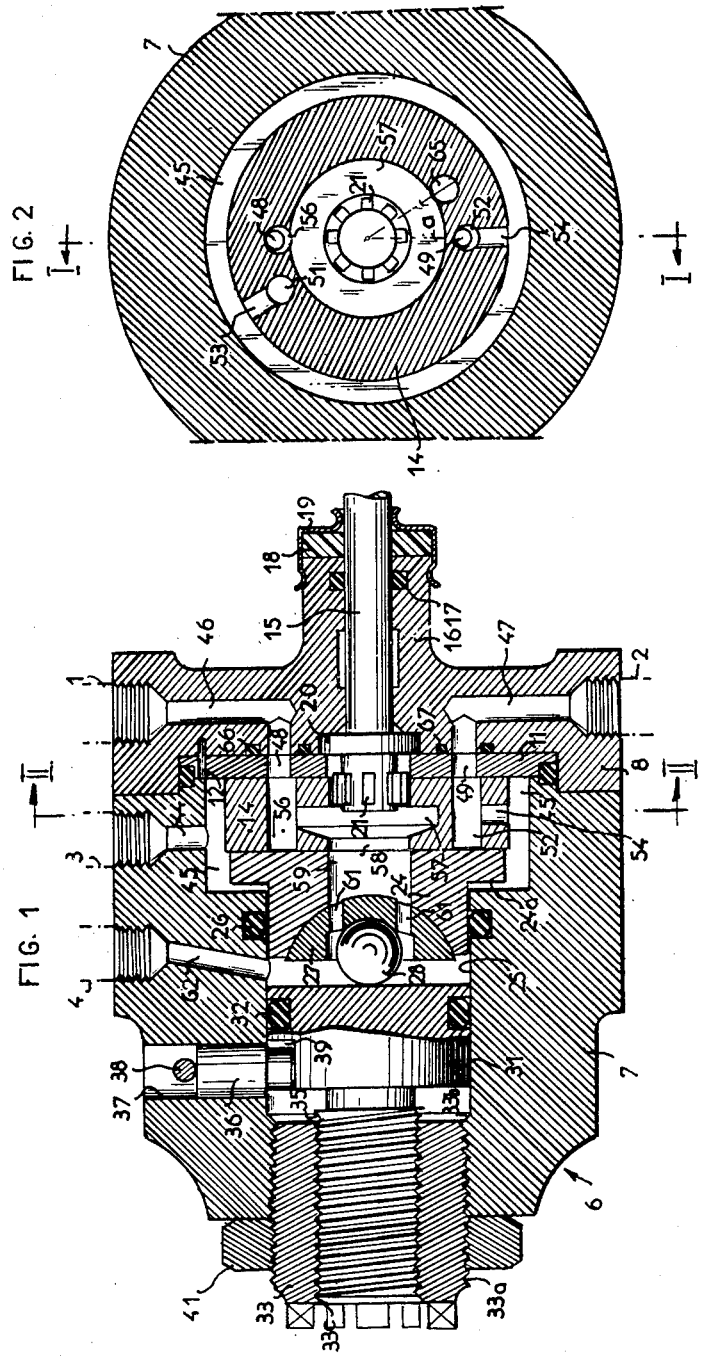

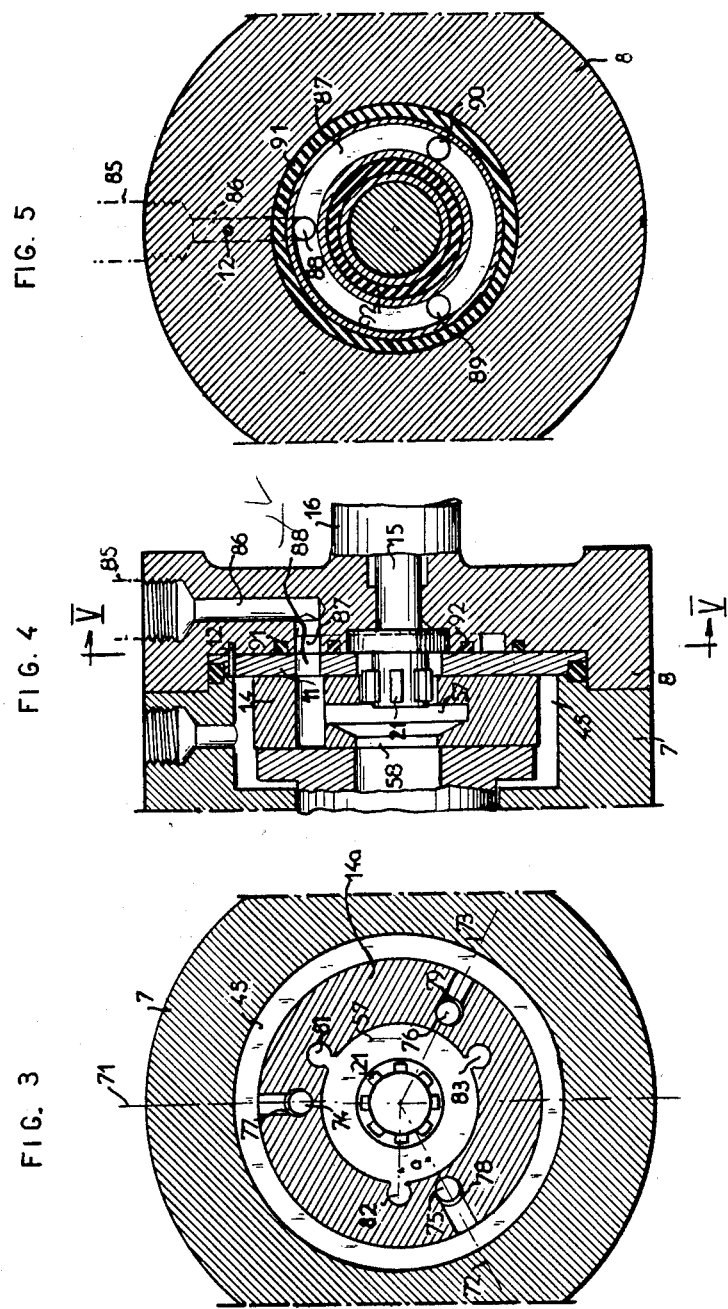

Sept. 21, 1965  P. E. MERCIER  3,207,180
PRESSURE FLUID DISTRIBUTORS
Filed June 24, 1963  4 Sheets-Sheet 3
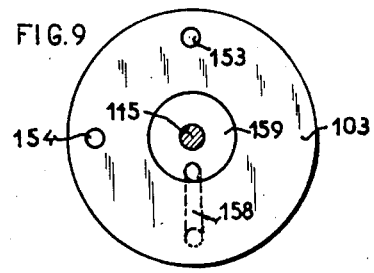
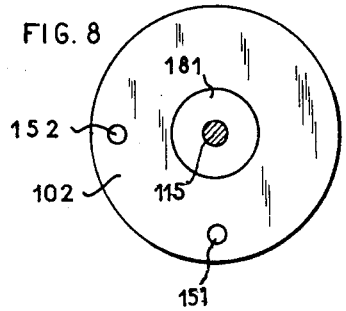
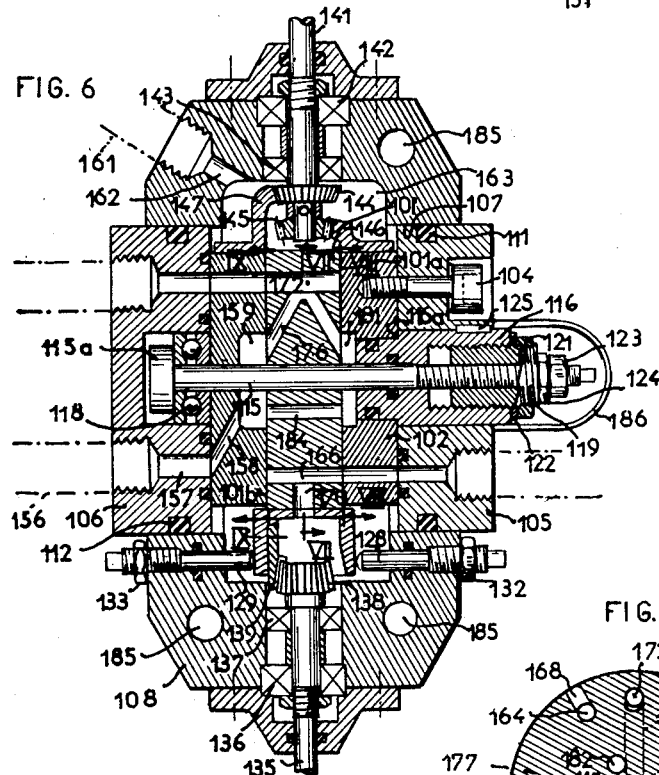

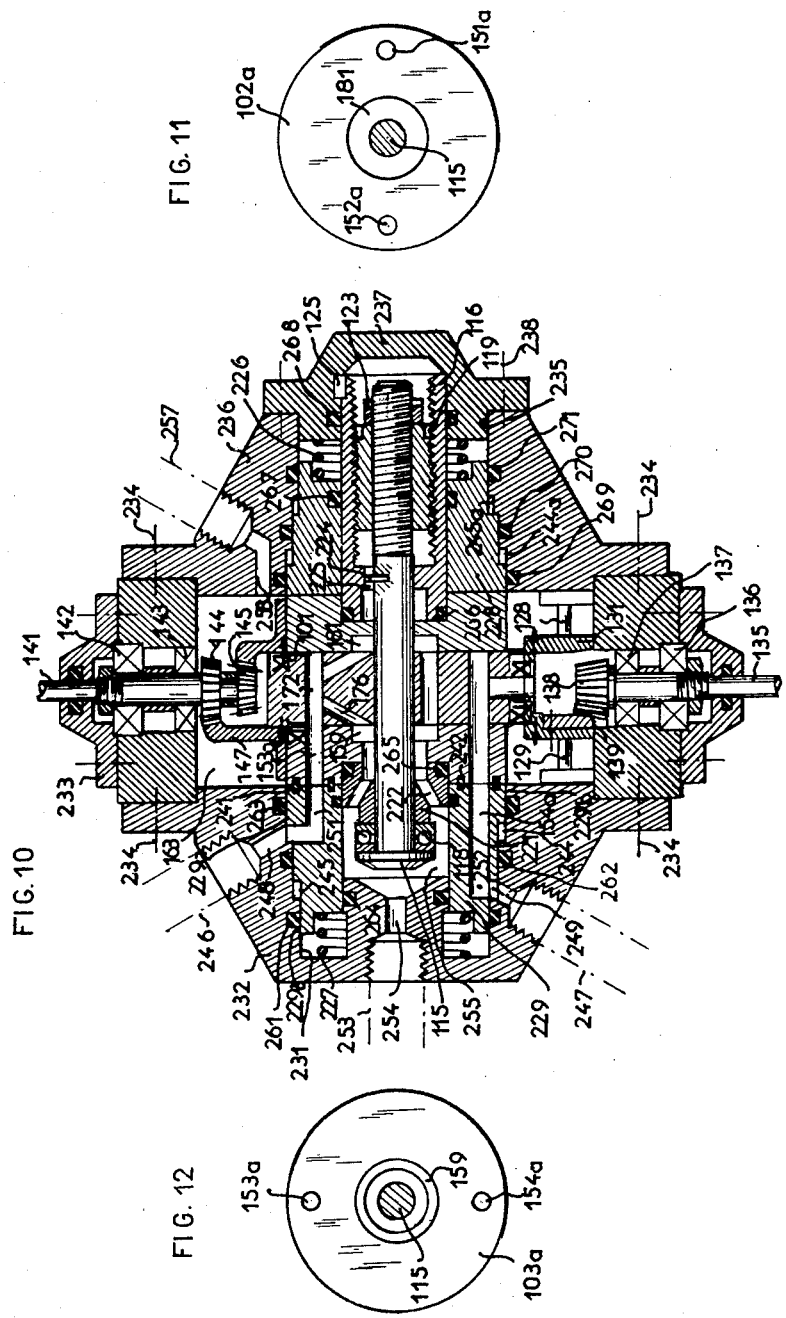

United States Patent Office 3,207,180
Patented Sept. 21, 1965

3,207,180
PRESSURE FLUID DISTRIBUTORS
Pierre Ernest Mercier, Piscop, France, assignor to Sferma, Société Française d'Entretien et de Réparation de Matériel Aéronautique, Suresnes, Seine, France
Filed June 24, 1963, Ser. No. 290,045
Claims priority, application France, June 28, 1962, 902,304
8 Claims. (Cl. 137—625.21)

The present invention is concerned with pressure fluid distributors, such as for example hydraulic distributors.

In many industrial uses and particularly in various kinds of suspensions for motor vehicles and several control devices, there is need for pressure fluid distributors with the possibility of return to the tank. Such distributors are frequently in the form of translationally movable elements of the type known as slide valves. The slide valves have the disadvantage of requiring very close manufacturing tolerances if it is desired to avoid losses of fluid under pressure and moreover, since they are often expected to function with very low operating forces, their manufacture is made still more difficult.

The object of the invention is to provide a pressure fluid distributor which does not have the aforesaid disadvantages of known distributors.

For this purpose, the pressure fluid distributor according to the invention is constituted by a disc having parallel plane faces, a first face of which is adapted to be displaced by a control member, while remaining applied against a fixed plane face of a casing under the action of the pressure exerted on its opposite face by a similar plane face of a bearing part, said member being perforated from side to side by at least one distributing duct which opens on its two plane faces and which is on the one hand in permanent communication with the exterior of said disc and on the other hand in communication, in only one specific relative position of the disc against said surface, with a passage in the casing which opens on the aforesaid fixed plane surface of said casing.

Owing to this particular structure, the distributor requires only plane grinding operations for its manufacture, and therefore production is as simple as could be desired, and the relative movement of the disc and the casing can be of a small amplitude and the forces at the operating member can be small. Furthermore, since the distributing ducts of the discs extend right through said disc, the friction of the disc against the casing is not influenced by the pressure variations in said duct during the functioning of the apparatus.

In one form, the connection between a distributing duct of the disc and the exterior of the disc is effected by a communicating duct which communicates with said distributing duct and opens on the peripheral surface of the disc.

In another embodiment, communication between a distributing duct of the disc and the exterior of said disc is effected by a communicating duct which communicates with said distributing duct and opens into a central cavity of the disc communicating with a corresponding hole which extends through the bearing part from side to side.

In most cases, the apparatus will be constructed in the form of a combination of the two aforesaid forms and, in this case, the peripheral surface of the disc will be situated in a sealing-tight chamber connected to a first pipe, while the hole in the bearing part opens into another sealing-tight chamber connected to a second pipe, and the passage in the casing is connected to a third pipe, the disc comprising at least one distributing duct in communication with its external surface and a distributing duct in communication with its central cavity and the hole in the bearing part so that in a first relative position of the disc with respect to the casing, all communication is interrupted between the three pipes and, in a second position and in a third position, the third pipe is connected respectively to the first and second pipes, or in other words the apparatus is a reversing device with a neutral position.

In order to ensure reliable and permanent application of the bearing part against the disc and of the disc against the casing, in a constructional form wherein the aforesaid first pipe is permanently subjected to the pressure of the fluid, the bearing part has an annular surface subjected to said pressure and directed to the side opposite to the face with which the bearing part bears against the disc.

In another constructional form, in order to obviate the disadvantage of unduly increasing the hardness of the operating member under the action of the pressure acting on the aforesaid annular surface of the bearing part, the apparatus is provided with an adjustable-pressure mechanical member bearing on the casing and exerting a pressure on the bearing part towards the disc.

In a third constructional form, which is the most elaborate, the two latter constructional forms are combined, preferably in such a manner that the adjustable mechanical pressure supplies only a fixed additional action to effect sealing-tightness during operation, under a low operating force.

With a view to ensuring perfect contact between the plane surfaces of the apparatus without possible oblique stresses due to lack of parallelism in the surfaces or the connections to the control member, the aforesaid adjustable-pressure mechanical member acts on the bearing part via a ball joint.

Furthermore, in order to ensure symmetrical reactions of the fluid on the mobile member and to reduce operating forces, which is advantageous for a servo-controlled distributor, the rate of flow of the distributing ducts is increased and for this purpose their number is increased and they are connected in parallel by an annular groove of the casing with the third pipe mentioned hereinbefore.

This latter arrangement is of course applicable when the apparatus comprises several outlet pipes.

In one particular embodiment, the relative movement of the disc with respect to the casing is a rotational movement about a geometric axis perpendicular to the aforesaid plane faces.

In one particular constructional arrangement, the control member for the pivoting movement of the disc is a shaft connected rotationally to the disc by a connection which allows the possibility of some slight obliquity of said shaft relatively to the disc to compensate for machining inaccuracies and to permit perfect application of the plane surfaces against one another.

In certain uses, and more particularly in the field of servo-control, it is desirable to connect together two distributors subjected to at least two conditions, for example relative phase and mean opening. This is why in one form one and the same casing contains at least one mobile distributor having internal passages used for transfer of fluid to the two faces of said distributor, the surfaces applied on one side and the other of said mobile distributor being adapted to be displaced with a distinct limited relative movement in each case relatively to the casing.

The invention is illustrated by way of example in the accompanying drawings, in which:

FIGURE 1 is a longitudinal sectional view taken on the line I—I of FIGURE 2, of a pressure fluid distributor according to the invention, FIGURE 2 is a partial section view taken on the line II—II of FIGURE 1, FIGURE 3 shows a variant of the structure of FIGURE 2, FIGURE 4 shows a variant of part of FIGURE 1, FIGURE 5 is a sectional view taken on the line V—V of FIGURE 4, FIGURE 6 is a longitudinal sectional view of another form of embodiment of a distributor according to the invention, FIGURES 7 to 9 are partial sectional views taken respectively on the lines VII—VII, VIII—VIII and IX—IX of FIGURE 6, FIGURE 10 is a longitudinal sectional view of a variant of the distributor of FIGURES 6 to 9 and FIGURES 11 and 12 are partial sectional views taken respectively on the lines XI—XI and XII—XII of FIGURE 10.

The pressure fluid distributor shown in the drawings has a rotatable distributing member and is intended to act as a reversing device with a neutral position. In this example, it is capable of connecting several (in the present case two) utilization pipes either to a pressure fluid pipe 3 or to a pipe 4 connected to the tank so that when any one of the two utilization pipes is connected to the pressure source the other is connected to the tank, with the possibility of simultaneously isolating the two utilization pipes from one another and from the tank and also from the pressure source.

The apparatus comprises a casing indicated generally at 6 and constituted, for manufacturing reasons, of two parts 7, 8 connected to one another by any conventional suitable means (not shown).

The part 8 of the casing has an internal bearing face which likewise for manufacturing reasons is constituted by a fitted-on plate 11 preferably made of hardened steel, which is gripped between the two parts 7, 8 where the casing is centered and also prevented from relative rotation by a stud 12. Applied against the plates is a rotary disc 14 with parallel faces, preferably made of hardened steel, which is the distributing member of the apparatus. The disc 14 is connected rotationally to a control member constituted by a shaft 15 which is journalled in a boss 16 of the part 8 of the casing. Sealing-tightness between this shaft and the casing is effected by a sealing ring 17 and by a felt washer 18 gripped by a ring 19 clamped elastically on the end of the boss 16 of the casing. The axial location of the control shaft 15 is ensured by a collar 20 fast with the shaft and held between a shoulder of the casing and the edge of a central hole in the plate 11.

The geometric axis of the shaft 15 is perpendicular to the faces of the distributor disc but, in order to avoid any oblique stress due to machining inaccuracies which might give rise to leakages, the control shaft 15 has been connected to the disc 14 by a spline arrangement 21 allowing very slight freedom of movement between the two parts in radial planes.

Against the disc 14 there is applied a bearing part 24 centered with some clearance in a bore 25 of the part 7 of the casing, and sealing-tightness between these two parts is ensured by a sealing ring 26 which allows the bearing part to be very slightly inclined if necessary with respect to the bore of the casing in order that the plane face of the bearing part shall bear perfectly against the corresponding plane face of the disc.

The disc 14 is lightly clamped between the plate 11 and the bearing part 24 on the one hand by the action of the fluid pressure as will be seen hereinafter and, on the other hand, by a mechanical pressure system comprising a part 27 in contact with the bearing part by a spherical bearing surface, a ball 28, in contact also by means of a spherical bearing surface with the bearing part, a piston 31 whose plane end bears against the ball and which can slide in the bore of the casing. The sealing-tightness is ensured by a sealing ring 32, and a differential adjustment sleeve 33 comprising an external screwthread 33a engaging with a corresponding internally screwthreaded part 33b of the bore 25 of the casing, and an internal screwthread 33c engaging with the screwthreaded rod 35 of the piston 31, with these two screwthreads having slightly different values in order to permit fine adjustment of the working clearances.

A stud 36 retained in a hole 37 in the casing by a pin 38 is engaged in a longitudinal slot 39 of the cylindrical surface of the piston 31 and prevents the latter from rotating in order that the setting shall be maintained. A locknut 41 screwed on the adjustment sleeve 33 locks the latter against the corresponding end of the casing.

The pipe 3 connected to the source of fluid under pressure leads to a hole 44 in the casing communicating with an annular chamber 45 in which is situated the distributor disc 14 and a portion of the bearing part 24 having an annular surface 24a directed in the direction opposite to the plane bearing contact surface of the said bearing part and the disc. The pressure exerted on this annular surface 24a presses the bearing part against the disc.

The two utilization pipes 1, 2 are connected respectively by passages 46, 47 in the casing to holes 48, 49 in the plate 11. Furthermore the distributor disc 14 has two distributing ducts 51, 52 which extend therethrough from side to side and are connected permanently to the annular chamber 45 by radial communicating ducts 53, 54 respectively. The two distributing ducts 51, 52 of the disc are situated at such a distance from the axis of the disc that the two holes 48, 49 formed in the fixed plate 11 are in communication with the ducts in a certain angular position of the disc.

The circuit connecting the utilization pipe 1 to the tank comprises the passage 46 in the casing, the hole 48 in the plate 11, a distributing duct 56 extending through the distributing plate 14 from side to side but which also while being adapted in another angular position of the disc to come opposite the hole 48 in the plate, is nearer the axis of the disc than the duct 51, so as to intersect a chamber 57 in the disc, a central hole 58 of the disc communicating with the chamber, a central hole 59 of the bearing part 24, longitudinal holes 61 in the spherical bearing part 27, the bore 25 in the casing, and a passage 62 in the casing to which is connected the pipe 4 returning to the tank.

In a similar manner the circuit for connecting the utilization pipe 2 to the tank comprises the passage 47 in the casing, the hole 49 in the plate 11, a duct 65 in the disc similar to the duct 56, then the central chamber 57 and thence the same path as in the case of the other utilization pipe as far as the pipe 4.

The arrangement is such that when the duct 56 in the disc is situated opposite the hole 48 in the plate, it is the duct 52 of the disc which is opposite the hole 49 in the plate and conversely when the duct 51 of the disc is situated opposite the hole 48 it is the duct 65 which is opposite the hole 49. Thus when the utilization pipe 1 is connected to the tank, the utilization pipe 2 is connected to pressure while conversely when the pipe 2 is connected to the tank it is the pipe 1 which is under pressure.

The intermediate angular position of the disc is a neutral position in which the circuits of all the pipes are interrupted since the four ducts of the distributor disc are not situated opposite any hole of the plate 11.

The amplitude of the pivoting movement of the disc in order to pass from one end position to the other is very small, and is indicated by the angle "a".

All of the central inner part of the apparatus is connected to the tank, that is to say to a zone of low pressure and this facilitates making the control shaft sealing-tight at the place where it passes through the casing.

The sealing-tightness of the edges of the holes 48, 49 of the plate 11 at the casing side is ensured by annular sealing elements 66, 67 respectively.

The pressure exerted on the annular surface 24a of the bearing part 24 presses the latter against the distributor disc 14 and tends to oppose the separation of these two parts which is a tendency caused by the infiltration of fluid under pressure between their edges and the pressure exerted by the fluid under pressure in the distributing ducts 51, 52 of the disc 14 which are connected by the communicating ducts 53, 54 to the annular chamber 45 subjected to the pressure of the pipe 3.

In order to avoid making the disc difficult to move, the assembly is so dimensioned that the action of the pressure on this annular surface 24a is not sufficient to ensure the appropriate support of the parts and the necessary additional assistance is taken from the mechanical pressure system whose differential sleeve 33 is regulated accordingly.

In the variant shown partially in FIGURE 3, it is assumed that there are three utilization pipes terminating respectively in three passages in the casing represented simply by their axes 71, 72, 73 and opening into three corresponding holes 74, 75, 76 in the plate 11.

The distributor disc 14a has three ducts 77, 78, 79 for connection to pressure and three ducts 81, 82, 83 for communication with the tank. The assembly is so arranged that the three utilization pipes are connected simultaneously either to the tank or to pressure, and change-over from one condition to the other is effected by pivoting the distributor disc through an angle "a". As in the form of embodiment shown in FIGURES 1 and 2, when the disc occupies an intermediate angular position, all the pipes are isolated.

FIGURES 4 and 5 are partial views of another variant in which there is provided a single utilization pipe 85 connected to a passage 86 of the casing which opens into an annular groove 87 of the casing supplied by three holes 88, 89, 90 of the plate 11, each of these three holes being served by a tank communication duct and by a pressure communication duct formed in the distributor disc. This arrangement makes it possible to considerably increase the rates of flow by the creation of several circuits in parallel, so that the operating forces required are reduced. Sealing-tightness between the casing and the plate 11 in this example is ensured by two annular sealing elements 91, 92 arranged on either side of the annular groove 87.

In the forms of embodiment described hereinbefore, the distributor disc had only a single active face i.e. a face participating in distribution by the opening and closing of certain fluid ways.

In FIGURE 6 there is shown a further embodiment wherein the two faces 101a, 101b of disc 101 are active faces. They co-operate respectively with the corresponding two active faces of two distributing plates or parts 102, 103 which are fixed for example by screws such as 104 to two supporting parts 105, 106 respectively. One of these parts, for example the part 105, acts as the corresponding fixed part of the casing in the forms described hereinbefore, while the other part 106 acts as the bearing part. The two supporting parts 105, 106 are mounted so as to be pivotable in a bore 107 of casing 108, with sealing-tightness being ensured by sealing elements 111, 112.

A central pin 115 extends through the the distributing plate 103, the distributor disc 101, and the other distributing plate 102 and its supporting part 105, in a sleeve 116. One of the ends of the pin 115 has a head 115a which by means of a ball-type thrust bearing 118 bears against the outer face of the distributing plate 106 and its other end, which is screwthreaded, carries a differential adjustment sleeve 119 whose external surface, also screwthreaded with a pitch different from that of its bore, is engaged in the internally screwthreaded bore of the sleeve 116. The sleeve 116 can be locked relatively to the supporting part 105 by means of a nut 121 and a washer 122, and the pin 115 can be locked relatively to the adjustment sleeve 119 by means of a nut 123 and a washer 124. The sleeve 116 has a shoulder 116a which bears against the outer face of the distributing plate 102, while a key 125 prevents the sleeve 116 from rotating relatively to the plate. By means of the sleeve 119 with differential-pitch screwthreads, it is possible to adjust accurately the pressure between the active faces of the disc and the two distributing plates.

The assembly constituted by the disc, the two distributing plates and their supporting parts is positioned axially in the casing by an arrangement of two pins 128, 129 whose inner ends bear respectively against the two lateral faces of a U-section part 131 fast with the distributor disc 101. This part extends only over part of the periphery of the disc, since the latter pivots through only a small angle relatively to the casing. The two fingers are screwed into the casing and they can be immobilized by means of nuts 132, 133.

The distributor disc can be pivoted in the casing by means of a control which comprises a shaft 135 supported in the median plane of the distributor disc by two ball bearings 136, 137 mounted in the casing and a bevel gearwheel 138 fast with the shaft and in mesh with a bevel gear annulus 139 fixed to the part 131 for the axial positioning of the disc.

In order to achieve a phase displacement in the distribution operations, there is provided a control for pivoting the two distributing plates in opposite directions, the control comprising a phase displacement control shaft 141 also supported in the median plane of the distributor disc by two ball bearings 142, 143 mounted in the casing, and two bevel gearwheels 144, 145 fast with the shaft and respectively meshing with two bevel gear annulus segments 146, 147 fast with the distributing plates 102, 103 respectively. The two gear pairs have the same pitch cones so that the angular displacements of the two distributing plates are symmetrical with respect to a reference position in the casing.

The parts of the fluid circuits are as follows: two utilization pipes terminate in two holes 151, 152 (see also FIGURE 8) of the distributing plate 102 and to simplify the situation, these two utilization pipes will be designated by the same reference numerals as the two aforesaid holes in which they terminate. Two utilization pipes terminating at two holes 153, 154 of the other distributing plate 103 (see also FIGURE 9), a pipe 156 connected to the source of fluid under pressure, and terminating, by a longitudinal passage 157 of the supporting part 106 and an oblique passage 158 of the plate 103, at a central chamber 159 of the plate, one wall of which is constituted by the adjacent active face of the distributor disc, and finally a pipe 161 for connection to the tank, the pipe terminating by an oblique passage 162 of the casing at the annular chamber 163 which surrounds the distributor disc.

The distributor disc has four longitudinal distributing ducts 164, 165, 166, 167 which extend therethrough from side to side and are in permanent communication with the peripheral surface of the disc by communicating radial ducts 168, 169, 170, 171, and then four other longitudinal distributing ducts 172, 173, 174, 175 which also extend therethrough from side to side and are in permanent communication with the annular pressure chamber 159 by oblique communicating ducts 176, 177, 178, 179. For balancing the pressures at the two faces of the disc, these latter oblique ducts are double and open also at the other face of the disc in an annular space 181 which communicates permanently with the central pressure chamber 159, by four other longitudinal ducts 182, 183, 184, 185 also extending through the disc from side to side.

The maximum amplitude of the pivoting of the distributor disc is indicated by the angle "a" in FIGURE 7. The phase displacement angles of the two distributing plates are substantially smaller than this angle "a," (in general half thereof for symmetrical phase displacement), but nevertheless it is necessary to provide a certain mobility of the pipes which are connected to these plates, since they are subjected to a certain pivoting movement relatively to the casing. To this end, flexible pipes can be used, or pipes which form one or more coil turns in the vicinity of the distributor so to give them some elasticity in order that the deformations which they are called upon to undergo should not be prejudicial to a good working life for these pipes.

At 185 there are indicated fixing holes for the casing 108 and at 186 a protective cap for the pressure adjustment device for the surfaces at which the disc bears against the plates.

The distributor operates in the following manner: when the parts are in the positions shown in the drawings, at the face of the plate 102, the utilization pipe 151 is connected to the tank by the following circuit; ducts 166 and 170 of the distributor disc, annular space 163 in the casing, passage 162 in the casing and pipe 161 for connection to the tank, while the utilization pipe 152 is connected to the pressure source by the following circuit: ducts 173 and 177 of the disc, central chamber 159, passage 158, passage 157 and pressure communication pipe 158. At the same time at the face of the other plate 103, the utilization pipe 154 is connected to the tank by ducts 167 and 171 of the disc, annular space 163 of the casing, passage 162 of the casing and pipe 161 for communication to the tank, while the other utilization pipe 153 is connected to pressure by passages 172 and 176 of the disc, central chamber 159, passages 158 and 157 and pipe 156.

If the distributor disc is pivoted through the angle "a" in the direction of the arrow f (FIGURE 7) it will be seen that the two ducts 165 and 174 which were previously inactive, for communication to the tank, take the place of the two pressure communication ducts 173 and 172, while the two previously inactive pressure ducts 175 and 174 take the place of the tank ducts 167 and 166, the replaced ducts occupying in their turn an inactive position in which they are not opposite a ultilization pipe either at one face of the disc or the other. In other words, after the pivoting of the disc through the angle "a," the pipes which were connected to the tank are now under pressure while conversely the pipes which were under pressure are now connected to the tank.

By regulating the angular position of the shaft 141, the phase displacement of the two distributing plates relatively to the casing is optionally modified and consequently optional modification is effected of the phase displacement of the conditions in which the pipes are situated which are connected respectively to the two plates.

It will be remarked that in this embodiment the distributing ducts extend through the disc from side to side but at only one of their ends co-operates with the orifices of the plates, their other end being situated in front of a solid portion of the corresponding plate, since the two holes of the utilization pipes in any one of the two plates are never opposite the two holes of the utilization pipes in the other plate. The pressures which prevail on either side of the disc are therefore always balanced.

The control system using bevel gearwheels could be replaced by a spur gearwheel control having the same ratio or by an arrangement with a pin engaged in a groove, or any equivalent means.

FIGURES 10 and 12 disclose a variant of the distributor shown in FIGURES 6 to 9, in which the pipes are connected directly to the casing and not to the pivoting parts, which makes it possible to use rigid pipes.

The general arrangement has great similarities in both apparatus and the same reference numerals are used to designate the same parts, and the same reference numerals except for the addition of the letter "a" are used to designate elements of similar structure but having some small differences such as the positioning of certain holes.

The central distributor disc 101 is absolutely identical, and pivots on the pin 115, and is positioned axially by the two fingers 128, 129 and can be pivoted by means of a bevel gearwheel control from the shaft 135.

The two distributing plates 102a, 103a are now applied against the corresponding faces of the disc both by mechanical means and by hydraulic means. The mechanical means comprise a differential adjustment arrangement with the pin 115 and the sleeve 119 which is internally and externally screwthreaded with different pitches. Interposed between the head of the pin 115 and the plates 103a are the ball-type thrust bearing 118 and a part 221 which has divergent holes 222 communicating with the central chamber 159 of the plate. The pin 115 is immobilized against rotational movement by a stud 224 fast with the pin and engaged in a longitudinal groove 225 formed in the bore of the sleeve 116. Since this sleeve is held against rotation by the key 125, the pin 115 is also held against rotation by means of the sleeve, and a single lock-nut 119 on the pin is necessary to lock the adjustment arrangement.

The mechanical means for locking the two plates against the disc also comprise two springs 226, 227 bearing respectively against two clamping parts 228, 229 which bear in turn against the outer faces of the two plates 102a, 103a. The clamping part 229 is lodged in a bore 231 of a bearing plate 232 fixed on the casing 233, for example by screws indicated simply by their axes 234. The spring 237 bears against the end of the bore 231 of this bearing plate. The other clamping part 228 is lodged in a bore 235 of another bearing plate 236 also fixed on the casing by screws 234 and closed by a cap 237 held by screws 238. The spring 226 bears against the end of the cap.

The balls 231 and 235 of the two bearing plates are co-axial with the distributor disc and the distributing plates, but in order to overcome any machining imperfections and any friction prejudicial to the proper functioning of the apparatus, the clamping parts 228, 229 have not been made fast with the plates 102a, 103a against which they grip, and they have simply been connected for rotation. In the example, this connection is ensured simply by the presence of annular sealing elements such as 241, 242 which surround the corresponding holes of the plates such as 153a, 154a.

The hydraulic means mentioned hereinbefore which contribute for applying the two plates against the central disc serve also and more especially for applying the two clamping parts 228, 229 against the plates. For this purpose, the outer cylindrical surface of each of the two clamping parts, for example the part 229, is stepped to form three portions 229a, 229b and 229c whose diameters decrease from the interior towards the exterior. These three steps define two annular spaces 244, 245 in permanent communication respectively with the two utilization pipes 246, 247 by the passages 248, 249 of the bearing plate 232. The cross-sections of these two annular spaces are calculated so that they correspond to the cross-section of the passages 251, 252 of the clamping part 239 constantly in communication with the passages 153a, 154a of the plate 103a, which can be alternately under pressure or connected to the tank. Thus it is possible to regulate optionally the value of the hydraulic pressure in the direction of the central disc.

The pipe 253 for supplying pressure fluid to the apparatus is connected to an axial passage 254 of the bearing plate 232. This passage opens into a bore 255 of the clamping part 229, the diameter of this bore being greater than that of the central chamber 159 also subjected to the pressure of the fluid, so that the plate 103a is applied against the central disc inter alia under the differential action of these two hydraulic pressures.

The same arrangement is found at the other side of the apparatus, and more particularly the two annular spaces 244a, 245a are in permanent communication respectively with the two corresponding utilization pipes (not shown) but connected permanently to the two holes 151a, 152a of the distributing plate 102a. Similarly, the diameter of the sleeve 116 is greater than the diameter of the central chamber 181 of the distributing plate 102a, so that the pressure of the fluid (without through flow) exerts on the plate a predominant pressure against the central disc and contributes to ensuring fluid-tightness between these two parts. The mechanical device constituted by the two springs 226, 227 and the differential sleeve adjustment arrangement 119 ensures the clamping of the parts before the apparatus is connected to the pressure fluid source, and tends to oppose the initial disengagement of the parts.

The pipe 257 for connection to the tank is connected to a passage 258 of the bearing plate 236 communicating with the annular space 163 of the casing.

Finally, various annular sealing elements are designated by reference numerals 261 to 271.

The method of operation is as follows:

The central distributor disc being in the position which it occupies in FIGURES 10 and 7, the utilization pipe 246 is connected to the pressure pipe 253 by hole 248 of the bearing plate 232, passage 251 of the clamping part 229, passage 153a of the plate 103a, ducts 172 and 176 of the disc 101, chamber 159 of the plate 103a, divergent holes 222 of the part 221, bore 255 and axial hole 223 of the bearing plate 232, while the other utilization pipe 247 is connected to the pipes 57 communicating with the tank, by passage 249 of the bearing plate 232, longitudinal passage 252 of the clamping part 229, passage 154a of the plate 103a, ducts 166 and 170 of the central distributor disc, annular space 163 of the casing, and passage 258 of the bearing plate 236.

For this same position of the central distributor disc, the two utilization pipes (not shown) connected to the other bearing plate 236 of the apparatus are in communication respectively through the holes 151a and 152a of the distributing plate 102a with the tank, by way of the ducts 167 and 171 of the disc (FIGURE 7) and with pressure by way of the ducts 173 and 177 of the disc.

If the central distributor disc is pivoted through the angle "a" in the direction of the arrow f (FIGURE 7), the ducts of the central disc for communicating with the tank and the ducts for communicating with pressure are changed over and consequently the same applies to all the utilization pipes.

For an intermediate position of the disc, the circuits of all the pipes are interrupted.

The phase displacement can be regulated by rotating the shaft 141 in one direction or the other, as in the form of embodiment shown in FIGURE 6, but since the utilization pipes are connected to the bearing plates of the casing they do not have to undergo any deformation during the course of this movement.

Of course, the invention is not limited to the forms of embodiment described and illustrated.

For example, instead of carrying out a pivoting movement, the distributor disc could carry out a translational movement and could be given any other suitable form other than circular, the number of utilization pipes could be any other number than those indicated here by way of examples, and the apparatus does not necessarily control the connection to the tank and the connection to pressure of one or more utilization pipes but could, on the contrary, be used for effecting any desired combination of circuits either simultaneously or successively.

I claim:

1. A valve assembly comprising a body having a pressure fluid inlet port, an exhaust port and a cylindrical wall portion, said body being provided with at least one motor duct therein, three coaxial disc members within said body, adjustable means for maintaining said three disc members in face to face and fluid-tight engagement, the central disc member defining a disc valve rotatable relative to the two outermost disc members and providing with said cylindrical wall portion an annular space communicating with one of said ports, fluid passage defining means in one of said outermost disc members communicating with the other port and having at least a portion thereof extending axially of said one outermost disc member, at least one of said outermost disc members having at least one fluid passage radially spaced from said axial passage and communicating with said motor duct, and channel defining means in said disc valve, said channel defining means including at least two parallel longitudinal bores extending entirely through said disc valve so as to have one end constantly sealed by one of said outermost disc members and positioned to have the other end registering with said radially spaced passage in response to rotation of the disc valve, means defining a first substantially radial bore for establishing communication between one of said two longitudinal bores and said axial passage, and means defining a second substantially radial bore for establishing communication between the other longitudinal bore and the annular space.

2. The valve assembly as claimed in claim 1 in which said adjustable means is defined by a mechanical adjustable pressure member bearing against the body and a ball joint between said pressure member and one of said disc members.

3. The valve assembly as claimed in claim 1 in which said body is provided with an annular groove and one of said outer disc members having a plurality of holes connected to said annular groove.

4. The valve assembly as claimed in claim 1 including a control member for displacing said disc valve extending axially of the body and operably connected to the disc valve in a zone in which minimum fluid pressure prevails.

5. The valve assembly as claimed in claim 1 including control means for displacing said disc valve defined by a central shaft extending axially of the body, and means fastly attaching the disc valve to the central shaft.

6. The valve assembly as claimed in claim 1 including control means for displacing said disc valve, said control means being defined by a central shaft extending axially of the body, and connecting means between said shaft and disc valve allowing slight freedom of movement between the shaft and disc valve in radial planes for avoiding any oblique stress due to machining inaccuracies.

7. The valve assembly as claimed in claim 1 including control means for displacing said disc valve, said control means being defined by a central shaft extending axially of the body, and complemental gear means on the shaft and the peripheral face of the disc valve for connecting the shaft and disc valve.

8. The valve assembly as claimed in claim 1 including a control member for displacing said disc valve extending into the body and operably connected to the disc valve, two outer rotatable circular distributing plates for the disc valve pivotable coaxially to the disc valve so as to be movable in the body under the action of the control member in opposite directions to each other in both directions of movement of the disc valve, and gear means of the same ratio operably connected to each of said circular plates for pivoting the same adapted to be actuated by said control member.

References Cited by the Examiner

UNITED STATES PATENTS 2,879,797 3/59 Guaraldi _____ 137—625.21
3,115,160 12/63 Rogers _____ 137—625.24 XR M. CARY NELSON, *Primary Examiner.*

MARTIN P. SCHWADRON, *Examiner.*